United States Patent Office 2,744,052
Patented May 1, 1956

2,744,052

HYDROGENATION OF HYDROCARBON OILS, TUNGSTEN, MOLYBDENUM, AND NICKEL CONTAINING CATALYSTS THEREFOR AND THEIR PREPARATION

Kenzie Nozaki, El Cerrito, Calif., assignor to Shell Development Company, New York, N. Y., a corporation of Delaware No Drawing. Application March 28, 1955,
Serial No. 497,417

16 Claims. (Cl. 196—24)

This invention relates to the hydrogenation of hydrocarbon oils containing one or more of aromatics, sulfur-containing and nitrogen-containing organic substances and to new and improved supported catalyst therefor and a process for its preparation.

The hydrogenation of aromatic hydrocarbons is, compared to many hydrogenation reactions, quite difficult to effect. Relatively severe conditions must be applied with a catalyst of high activity. It is especially difficult to effect this hydrogenation selectively, since the relatively severe conditions required for a rapid hydrogenation with sulfur insensitive catalyst are prone to lead to destructive hydrogenation, sometimes called hydrocracking. This latter reaction is to be avoided as far as possible, since it destroys reactant, consumes large amounts of hydrogen, and furthermore tends to cause deactivation of the catalyst.

Nearly all of the numerous materials known to be capable of catalyzing hydrogenation of one material or another are capable of effecting these hydrogenations to at least some extent. However, for practical application, the catalyst should fulfill the following requirements: it should exhibit a high activity for the hydrogenation of aromatic hydrocarbons; it should have little or no tendency to catalyze hydrocracking (destructive hydrogenation); it should be immune to poisoning by sulfur compounds and other impurities normally encountered in aromatic oils; it should have a relatively low density; and its cost per pound should be reasonably low. Few, if any, of the catalysts hitherto used for this purpose have fulfilled these requirements. It is believed that the best catalyst from the standpoint of activity and performance so far known consists essentially of nickel and tungsten sulfides. As used in Germany, this catalyst consists of approximately two mols of tungstens sulfide per mol of nickel sulfide. The corresponding catalyst used in the United States consists of about two mols of nickel sulfide per mole of tungsten sulfide. This latter catalyst has essentially the same activity as the former. While this catalyst is excellent from the standpoint of activity and performance, it is deficient in being very costly. Its cost of around $4000 per barrel renders this catalyst impractical for most applications.

Perhaps the next best catalyst and that most widely used in the United States consists essentially of a supported cobalt-molybdate catalyst. This catalyst, which is available from several manufacturers, is generally prepared by impregnating a suitable base, particularly alumina, with soluble salts of cobalt and molybdenum, e. g. cobalt nitrate and ammonium molybdate, and calcining to produce the corresponding oxides. The catalyst, while less active than the mentioned tungsten-nickel sulfide catalyst, is much less costly and consequently is more economical to use.

In the literature, and particularly in the patent literature, many references are made to the group of so-called sulfactive catalysts consisting of or comprising compounds, e. g. the oxides or sulfides, of the metals of group VI, e. g. chromium, molybdenum and tungsten, in combination with metal compounds, e. g. the oxides or sulfides, of the metals of group VIII, particularly the iron group, i. e. iron, cobalt and nickel. See for example U. S. Patent No. 2,455,713. The two above-described catalysts fall in this group and are indeed the best of the known various combinations of the group for the purpose at hand.

Combinations of nickel and molybdenum with suitable supports have been repeatedly tried for effecting various hydrogenation reactions and are not infrequently mentioned in the literature. It is pretty well established by various investigations, however, that this combination is inferior to cobalt with molybdenum and, as far as I am aware, has never appeared sufficiently attractive to come into commercial use.

The superiority of the Co-Mo/$Al_2O_3$ catalyst over Ni-Mo/$Al_2O_3$ catalyst is shown in the data given in the following Tables I, II and III (see U. S. Patents 2,687,370 and 2,687,381).

*Table I.—Hydrogenation of shale oil distillate*

| Catalyst | Product Analysis | |
|---|---|---|
| | N | S |
| Catalyst A—Co-Mo/$Al_2O_3$ | .35 | 0.06 |
| Catalyst B—Ni-Mo/$Al_2O_3$ | .45 | 0.15 |

Catalyst A was prepared by impregnating a silica stabilized alumina support with about 9.1% $MoO_3$ and 4.4% CoO. Catalyst B was prepared in a similar manner, incorporating 9.1 $MoO_3$ and 4.4% NiO. Both catalysts were reduced with hydrogen at atmospheric pressure and a temperature of 1050° F. prior to use.

*Table II.—Desulfurization of Santa Maria Valley distillate*

| Catalyst Co-Mo/$Al_2O_3$ | Percent Sulfur in Product | Catalyst Ni-Mo/$Al_2O_3$ | Percent Sulfur in Product |
|---|---|---|---|
| C | 0.21 | C' | 0.32 |
| D | 0.16 | | |
| E | 0.22 | E' | 0.31 |
| F | 0.17 | F' | 0.27 |
| G | 0.17 | | |

Contrary to the previous belief based upon numerous data of which the above are illustrative, it has been found that certain catalysts of the Ni-Mo-alumina combination are quite superior to the best Co-Mo-alumina catalyst presently used. Thus, even at the same total metals content this new catalyst is approximately 2½ times as active for the hydrogenation of crude alpha-methyl naphthalene as the standard Co-Mo-alumina catalyst, and at the optimum total metals content it is even more active. This catalyst and its preparation are fully described in copending application, Serial No. 490,683 filed February 25, 1955, of which the present application is a continuation-in-part. The unexpected superiority of this Ni-Mo-alumina catalyst is, of course, not found with with Ni-Mo-alumina catalyst in general but only in those prepared with specific ratios of the constituents and in a specified manner. It has now been discovered that this catalyst may be further increased in activity through the proper incorporation of tungsten. The catalyst of this invention therefore contains as essential ingredients tungsten, molybdenum, nickel and alumina in certain proportions prepared in a specific manner which is similar to that described in the mentioned copending application.

In the catalyst of the invention, all of the components interact to produce an enhanced activity and are equally important. The main constituent, in terms of weight percent, is substantially a micro-porous alumina.

Although the alumina may contain up to about 10% of water of hydration, it is usually found that catalysts of somewhat better activity are obtained if the alumina is first calcined, e. g., at a temperature of about 500–600° C., to convert it to a substantially anhydrous gamma alumina. While this is relatively important when using an essentially pure alumina such as the Activated Aluminas (Alorco grades F–1 and F–10) it is less so in the case of the silica-containing gel type alumina such as Alorco grade H–41 which is intended primarily as a desiccant and contains about 5 to 10% of combined water.

The aluminas found in commerce usually contain small amounts of sodium which is most difficult to remove. The residual sodium appears to have no adverse effect on the activity of the catalyst and may in fact be beneficial in making the catalyst less prone to catalyze cracking.

While pure alumina is quite suitable, the preferred alumina contains from about 1% to about 7% silica uniformly combined with the alumina. One method for obtaining the desired uniform combination is, for instance, to precipitate the alumina in the presence of silica-sol. Other methods affording a uniform distribution may, however, be used. The concentration of silica should not exceed about 7% since higher concentrations impart an undesirable cracking activity to the catalyst.

Various of the above points are illustrated in the comparable data shown in the following Table III.

Table III.—Hydrogenation of crude alpha methyl naphthalene (Sulfur=0.88%—Nitrogen=0.20%)

| Catalyst | Percent W | Percent Mo | Percent Ni | Support | Rel. Activity |
|---|---|---|---|---|---|
| H | 9.7 | 6.0 | 3.2 | $TiO_2$ | 118 |
| I | 5.3 | 6.0 | 1.7 | $SiO_2$ | 118 |
| J | 5.3 | 6.0 | 1.7 | MgO | 147 |
| K | 5.4 | 6.0 | 1.7 | $Al_2O_3$ (Alorco alumina, grade H–41). | 576 |
| L | 5.4 | 6.0 | 1.8 | $Al_2O_3$ (Harshaw alumina, grade 0501). | 530 |
| M | 5.4 | 6.0 | 1.8 | $Al_2O_3$ (Harshaw alumina, grade 0401). | 565 |
| N | 5.4 | 6.0 | 1.8 | $Al_2O_3$ (Cyanamid alumina). | 295 |
| O | 5.4 | 6.0 | 1.8 | $Al_2O_3$ (Filtrol alumina). | 318 |

All catalysts H through O were prepared, treated, and tested in the same manner.

Relative activities are expressed on a liquid hourly space velocity basis, the standard Co-Mo-alumina catalyst pretreated with hydrogen being assigned an activity of 100.

The aluminas used in preparing catalysts K and M contained about 5% $SiO_2$.

The aluminas used in preparing catalysts N and O were aluminas of lower density than the others and for this reason the activity on a volume basis is lower. Per unit weight, catalyst N was more active than the others, while catalyst O had a relative activity of about 425.

The tungsten, molybdenum and nickel are incorporated in the alumina by impregnating the alumina with solutions of soluble compounds of these metals which compounds are converted to the corresponding metal oxides by calcination in air at temperatures of 500° C. or below without leaving a detrimental residue. Any of the thus decomposable compounds can be used. The tungsten is normally incorporated through ammonium tungstate, the molybdenum through ammonium molybdate, and the nickel through nickel nitrate. It is found, however, that a catalyst of somewhat superior activity (about 8–10% more active) is produced when the nickel is applied in the form of nickel acetate or nickel carbonate.

This is illustrated by the following comparative activities of four catalysts containing 5.4% W, 6.0% Mo and 1.7% Ni prepared in the same manner except for the form in which the nickel was incorporated.

Table IV.—Hydrogenation of crude alpha methyl naphthalene

| Catalyst | Nickel Salt | Relative Activity |
|---|---|---|
| P | Acetate | 628 |
| Q | Formate | 571 |
| R | Carbonate | 630 |
| S | Nitrate | 576 |

It is found that the ratios of these metals are important. Of the three ratios, that of nickel to molybdenum is most important. This ratio should be between ¼:1 and ⅔:1 and is optimum at between about ½:1 and ⅓:1.

The effect of these ratios, other things being equal, is shown in the following data.

Table V.—Hydrogenation of crude alpha methyl naphthalene

| Catalyst | Percent W | Percent Mo | Percent Ni | Approx. Mole Ratio | Rel. Activity |
|---|---|---|---|---|---|
| T | 5.3 | 6.0 | 1.7 | 0.5:1:0.5 | 570 |
| U | 9.7 | 5.6 | 3.2 | 1:1:1 | 610 |
| V | 5.4 | 3.1 | 1.8 | 0.5:0.5:0.5 | 476 |
| W | 4.9 | 11.2 | 1.6 | 0.5:2:0.5 | 546 |
| X | 9.7 | 5.6 | 3.2 | 1:1:1 | 588 |
| Y | 9.0 | 10.4 | 2.9 | 1:2:1 | 706 |
| Z | 2.9 | 6.6 | 1.8 | 0.25:1:0.5 | 541 |
| AA | 4.2 | 6.0 | 3.4 | 0.4:1:1 | 424 |
| BB | 5.3 | 6.1 | 0.9 | 0.5:1:0.25 | 470 |
| CC | 9.8 | 5.7 | 1.7 | 1:1:0.5 | 616 |
| DD | 0 | 11.7 | 3.3 | 0:2:1 | 590 |
| EE | 0 | 6.6 | 1.8 | 0:1:0.5 | 400 |

It will be noted that those catalysts in which the mole ratio of Mo to Ni is about 2:1 (catalysts T, W, Y, Z and CC) have the highest activity taking into consideration the total contents of metals. Thus, comparing catalysts T and W, the activity was increased approximately 4% by lowering the molybdenum content from 11.2% to 6.0%, whereas comparing catalysts U and Y, the activity was increased by approximately 15% by increasing the molybdenum content from 5.6% to 10.4%.

The preferred mole ratio of tungsten to molybdenum is from about ¼:1 to 1:1. The effect of the tungsten is seen by comparing, for example, catalyst DD with Y and catalyst EE with catalysts CC, Z and T.

The tungsten and molybdenum and nickel may be incorporated with the alumina together in a single impregnation step or in two or more such steps, or one or two of these metals may be incorporated first and then, after calcination to convert the compound to the metal oxide, the other metal or others may be incorporated. In this latter case, the incorporation of the molybdenum last gives catalysts of slightly higher activity as shown in the following comparable results.

Table VI.—Hydrogenation of alpha methyl naphthalene

| Catalyst | Order of Impregnation | Percent W | Percent Mo | Percent Ni | Rel. Activity |
|---|---|---|---|---|---|
| FF | Mo first | 5.3 | 6.0 | 1.7 | 546 |
| T | Together | 5.3 | 6.0 | 1.7 | 570 |
| GG | W, Ni first | 5.3 | 6.0 | 1.7 | 588 |
| HH | Mo first | 9.0 | 10.4 | 2.9 | 706 |
| Y | Together | 9.0 | 10.4 | 2.9 | 706 |
| JJ | W, Ni first | 9.0 | 10.4 | 2.9 | 735 |
| KK | Together—2 impregnations | 9.0 | 10.4 | 2.9 | 735 |
| LL | All but 5% Mo first—Remaining Mo last. | 9.0 | 10.4 | 2.9 | 765 |

The activity of the catalysts increases as the concentration of total metals (nickel + molybdenum) increases until a concentration of about 25% by weight (calculated as the metals) is reached. Concentrations above 25% considerably increase the cost of the catalyst with little benefit as regards activity. On the other hand a minimum of about 8% metals is required for high activity.

*Table VII.—Hydrogenation of alpha methyl naphthalene*

| Catalyst | Percent W | Percent Mo | Percent Ni | Percent Total Metals | Rel. Activity |
|---|---|---|---|---|---|
| Z | 2.9 | 6.6 | 1.8 | 11.3 | 541 |
| T | 5.3 | 6.0 | 1.7 | 13.0 | 571 |
| CC | 9.8 | 5.7 | 1.7 | 17.2 | 616 |
| Y | 9.0 | 10.4 | 2.9 | 22.3 | 706 |

Catalysts prepared as above described, do not have high activity unless they are partially sulfided under special conditions prior to use. It is the practice to reduce the standard Co-Mo-alumina catalyst (fresh oxide form) with hydrogen at a temperature of the order of 1000° F. for a short time prior to use. The above-described catalyst so treated is quite mediocre. Also, it is common to sulfide many catalysts of the general type by treating them with hydrogen sulfide at 300–400° C. prior to use. This is without any material benefit in the case of the standard Co-Mo-alumina catalyst and gives an inferior catalyst in the case of the above-described combination. In order to realize the high activity of the above described catalyst, it is necessary that the catalyst in the oxide form as obtained from the calcination step be partially sulfided under controlled conditions with hydrogen sulfide in the presence of at least an equal amount of hydrogen. It is important that this treatment be effected at a temperature above about 110° C. but below about 210° C. or 215° C.

While the ratio of hydrogen to hydrogen sulfide in the mixture used to partially sulfide the catalyst may vary over a considerable range, it is essential that both gases be present and that the hydrogen concentration be at least equal to the hydrogen sulfide concentration. Suitable ratios are from 1:1 to about 40:1. Other diluent gases may be present but may not be used as a substitute for the hydrogen or hydrogen sulfide. Thus, for example, if nitrogen is substituted for the hydrogen a catalyst of inferior activity results.

Organic sulfur compounds are also not equivalent to hydrogen sulfide in this treatment since they are insufficiently reacted at the temperatures used and if effective at all would require a greatly prolonged treatment.

The partial sulfiding is preferably effected under superatmospheric pressure but may also be effected at atmospheric pressure.

The necessary partial sulfiding of the catalyst may be effected in a quite short time. Thus, a treatment with hydrogen and hydrogen sulfide in a 12:1 mole ratio for one hour is ample. Longer times of treatment are however not detrimental. Shorter times may be sufficient providing that sufficient hydrogen sulfide is used to effect a substantial sulfiding of the catalyst. It should be pointed out, however, that complete sulfiding of the metals is not necessary. Thus, an amount of hydrogen sulfide sufficient to sulfide approximately one-half of the metals present is ample to obtain the high activities found. When using a gas mixture containing above about 5% hydrogen sulfide, a minimum treating time of about one-half hour under the described temperature conditions should be applied.

All of the above catalysts of the invention were partially sulfided by treating them with a mixture of hydrogen and hydrogen sulfide (12:1) at 200° C. for one hour.

That the unexpectedly high activity of the present catalyst prepared as described cannot be ascribed to the chemical composition above is evident from the fact that a catalyst of the same composition of catalyst T above when pretreated in the usual way with hydrogen at 375° C. for one hour has a relative activity under 300 and if pretreated with a mixture of nitrogen and hydrogen sulfide for one hour at 200° C. it has a relative activity of only 218. It is likewise evident that the high activity cannot be ascribed above to the conditions of partial sulfiding since the standard Co-Mo-alumina catalyst when partially sulfided under the same conditions has a relative activity of only 147.

The synergistic effects of the particular metals combined with the carrier in the described proportions in the described proper manner will be seen by comparing the activities of the catalyst of the invention with those of the following table. All of these except the first three were prepared with the same preferred carrier in the same preferred manner and subjected to the same described partial presulfiding.

*Table VIII.—Hydrogenation of crude alpha methyl naphthalene*

| Catalyst | Percent W | Percent Mo | Percent Ni | Percent Co | Relative Activity |
|---|---|---|---|---|---|
| MM | 10.5 | 4.9 | 3.4 | 1.1 | 353 |
| NN | 10.5 | 4.5 | 3.4 | 0.5 | 294 |
| OO | 6.0 | 5.1 | 1.8 | 0.55 | 183 |
| PP | 5.3 | 6.0 |  | 1.7 | 277 |
| QQ | 10.6 |  |  |  | 34 |
| RR |  |  | 3.6 |  | 12 |
| SS |  | 6.6 |  |  | 58 |
| TT | 10.0 | 5.8 |  |  | 88 |
| UU | 10.5 |  | 3.4 |  | 365 |
| VV |  | 6.6 | 1.8 |  | 400 |
| WW | 10.5 |  | 6.5 |  | 371 |

It will be noted that the individual components as well as the various combinations are considerably less active. Also various catalysts in which other metals of group VI were substituted for the W and/or Mo and also in which other metals of group VIII were substituted for the Ni were all much less active.

The catalyst of the invention not only has superior activity for the hydrogenation of aromatic hydrocarbons as shown, but it also affords a most practical advantage in being more economical to use. Thus, to effect a given hydrogenation a much smaller reactor suffices.

The hydrogenation of aromatic hydrocarbons using the present catalyst is preferably effected at a temperature between about 300° C. and 450° C. under pressures above about 20 atmospheres. The pressure in any case is sufficiently high to favor hydrogenation at the temperatures employed. In the above examples the crude alpha methyl naphthalene was hydrogenated at 375° C. under a pressure of 500 p. s. i. g. in the presence of 8.4 moles of hydrogen per mole of feed, the feed and hydrogen being passed continuously through a fixed bed of the catalyst.

The hydrogenation may be effected with the aromatic hydrocarbon in the liquid phase or in the vapor phase and the catalyst may be used in any of the conventional manners, to wit: a fixed foraminous bed of granules or formed pieces, a moving bed of such pieces, as a powder slurried in the liquid aromatic hydrocarbon to be hydrogenated, as a recirculated powder suspended in the reactant vapors, or as a fixed or continuous replenished bed of fluidized powder.

It is within the scope of the invention to regenerate or reactivate the catalyst after its activity has declined through use by treatment with hydrogen or by controlled burning of deposited carbonaceous material.

Most commercial aromatic hydrocarbons to be hydrogenated contain small to appreciable amount of compounds of sulfur, nitrogen and oxygen as impurities. These do no harm to the catalyst and in fact are desirable. It is also within the invention to dope the aromatic hydrocarbon to be hydrogenated with minor amounts of one and more such compounds prior to the hydrogenation.

While the catalyst of the present invention is primarily superior in affording a rapid and selective hydrogenation of various aromatic hydrocarbons, it will be appreciated that it is a highly active hydrogenation catalyst which may be applied in the other hydrogenation processes. The present catalyst may be substituted for the standard Co-Mo-alumina catalyst and the previously known Ni-Mo sulfide catalysts in any of the processes in which either of these known catalysts are suitable. The conditions to be applied are, of course, dependent upon the particular process in question. They will generally be the same as those applied with the prior catalysts except for the space velocity which, in view of higher activity of the present catalyst, will be higher. In view of its high activity, the catalyst of the present invention is quite advantageous for the hydrogenation of various petroleum oils to desulfurize and denitrogenize them.

The advantage of the present catalysts for the reduction in the content of nitrogen-containing compounds in hydrocarbon oils over corresponding cobalt catalysts, are shown by the comparative data in Table IX. The fact that the incorporation of tungsten further improves a nickel-molybdenum-alumina catalyst in its activity for reducing the nitrogen content, whereas there was no such improvement in a corresponding cobalt-molybdenum-alumina catalyst is also shown by data in Table IX. The catalysts PP, VV, T and Y were the same catalysts referred to in previous Tables VIII and V, and the nitrogen contents of the products were the values obtained in the previous examples designated in those tables according to the catalyst, the crude methyl naphthalene in each case containing 0.20% weight nitrogen, as organic nitrogen compound. Catalyst XX was prepared similarly to catalyst VV, except for the substitution of cobalt for nickel, and the activities for nitrogen removal were determined under substantially identical conditions.

*Table IX.—Hydrogenation of crude alpha methyl naphthalene containing 0.20% by weight nitrogen*

| Catalyst | Nitrogen Content of Product, percent w. |
|---|---|
| XX—Co/Mo/Al₂O₃ | 0.10 |
| VV—Ni/Mo/Al₂O₃ | 0.06 |
| PP—Co/Mo/W/Al₂O₃ | 0.10 |
| T—Ni/Mo/W/Al₂O₃ | 0.03 |
| Yᵃ—Ni/Mo/W/Al₂O₃ | 0.02 |

ᵃ Catalyst Y contained approximately twice as much Ni, Mo and W as catalyst T, but in the same mole ratios.

I claim as my invention:

1. Process for the hydrogenation of aromatics and sulfur-bearing hydrocarbon oils which comprises contacting the aromatics and sulfur-bearing hydrocarbon oil under hydrogenation conditions of pressure above about 20 atmospheres and temperature between about 360 and 450° C. in the presence of added hydrogen with a supported tungsten-molybdenum-nickel catalyst prepared by impregnating an alumina carrier with soluble compounds of tungsten, molybdenum and nickel convertible to the oxides upon calcination, the mole ratio of nickel to molybdenum being between ¼ and ⅔ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 215° C. but above about 110° C. with a mixture of hydrogen and hydrogen sulfide in a mole ratio between 1:1 and 40:1.

2. Process for the hydrogenation of aromatics and sulfur-bearing hydrocarbon oils which comprises contacting the aromatics and sulfur-bearing hydrocarbon oil under hydrogenation conditions of pressure above about 20 atmospheres and temperature between about 360 and 450° C. in the presence of added hydrogen with a supported tungsten-molybdenum-nickel catalyst prepared by impregnating microporous substantially anhydrous gamma alumina with soluble compounds of tungsten, molybdenum, and nickel convertible to the oxides upon calcination, the mole ratio of nickel to molybdenum being between ¼ and ⅔ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 215° C. but above about 110° C. with a mixture of hydrogen and hydrogen sulfide in a mole ratio between 1:1 and 40:1.

3. Process for the hydrogenation of aromatics and sulfur-bearing hydrocarbon oils which comprises contacting the aromatics and sulfur-bearing hydrocarbon oil under hydrogenation conditions of pressure above about 20 atmospheres and temperature between about 360 and 450° C. in the presence of added hydrogen with a supported tungsten-molybdenum-nickel catalyst prepared by impregnating an alumina carrier with soluble compounds of tungsten, molybdenum and nickel convertible to the oxides upon calcination, the mole ratio of nickel to molybdenum being between ¼ and ⅔ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 215° C. but above about 110° C. with a mixture of hydrogen and hydrogen sulfide in a mole ratio of about 12:1.

4. Process for the hydrogenation of aromatics and sulfur-bearing hydrocarbon oils which comprises contacting the aromatics and sulfur-bearing hydrocarbon oil under hydrogenation conditions of pressure above about 20 atmospheres and temperature between about 360 and 450° C. in the presence of added hydrogen with a supported tungsten-molybdenum-nickel catalyst prepared by impregnating an alumina carrier with soluble compounds of tungsten, molybdenum and nickel convertible to the oxides upon calcination, the mole ratio of nickel to molybdenum being between ⅓ and ½ to 1, the mole ratio of tungsten to molybdenum being between ¼ and 1 to 1, and the total metals content being below about 25% by weight, calcining to convert the metal compounds to the corresponding oxides, and partially sulfiding by treatment for at least ½ hour at a temperature below about 215° C. but above about 110° C. with a mixture of hydrogen and hydrogen sulfide in a mole ratio between 1:1 and 40:1.

5. Process for the hydrogenation of aromatics and sulfur-bearing hydrocarbon oils which comprises contacting the aromatics and sulfur-bearing hydrocarbon oil under hydrogenation conditions of pressure above about 20 atmospheres and temperature between about 360 and 450° C. in the presence of added hydrogen with a supported tungsten-molybdenum-nickel catalyst prepared by impregnating an alumina carrier with soluble compounds of tungsten, molybdenum and nickel convertible to the oxides upon calcination, the nickel being incorporated in the form of nickel carbonate before incorporating the molybdenum, the mole ratio of nickel to molybdenum being between ¼ and ⅔ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 215° C. but above about 110° C. with a mixture of hydrogen and hydrogen sulfide in a mole ratio between 1:1 and 40:1.

6. Process for the preparation of a catalyst having high activity for the hydrogenation of aromatics in aromatic and sulfur-bearing hydrocarbon oils which comprises impregnating an alumina carrier with soluble compounds of tungsten, molybdenum, and nickel convertible to the oxides upon calcination, the mole ratio of said metals being about 1:1:1, and the total metals content being above 8% by weight, calcining to convert the metal compounds to the corresponding oxides, further impregnating the calcined material with molybdenum to bring said mole ratio to about 1:2:1, again calcining to convert the further incorporated molybdenum to the oxide, and partially sulfiding by treatment for at least ½ hour at a temperature below about 210 but above about 110° C. with a mixture of hydrogen and hydrogen sulfide in a mole ratio between 1:1 and 40:1.

7. Process for the preparation of a catalyst having high activity for the hydrogenation of aromatics in aromatic and sulfur-bearing hydrocarbon oils which comprises impregnating an alumina carrier with soluble compounds of tungsten, molybdenum and nickel convertible to the oxides upon calcination, the mole ratio of nickel to molybdenum being between ¼ and ⅔ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 210° C. but above about 110° C. with a mixture of hydrogen and hydrogen sulfide in a mole ratio of about 12:1.

8. Process for the preparation of a catalyst having high activity for the hydrogenation of aromatics in aromatic and sulfur-bearing hydrocarbon oils which comprises impregnating an alumina carrier with soluble compounds of tungsten, molybdenum, and nickel convertible to the oxides upon calcination, the mole ratio of nickel to molybdenum being between ⅓ and ½ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 210° C. but above about 110° C. with a mixture of hydrogen and hydrogen sulfide in a mole ratio between 1:1 and 40:1.

9. Process for the preparation of a catalyst having high activity for the hydrogenation of aromatics in aromatic and sulfur-bearing hydrocarbon oils which comprises impregnating gamma alumina containing less than 7% silica with soluble compounds of tungsten, molybdenum and nickel convertible to the oxides upon calcination, the nickel being applied in the form of nickel carbonate, the mole ratio of nickel to molybdenum being between ¼ and ⅔ to 1, the mole ratio of tungsten to molybdenum being between ¼ and 1 to 1, and the total metals content being below about 25% by weight, calcining to convert the metal compounds to the corresponding oxides, and partially sulfiding by treatment for at least ½ hour at a temperature below about 210° C. but above about 110° C. with a mixture of hydrogen and hydrogen sulfide in a mole ratio between 1:1 and 40:1.

10. Process for the preparation of a catalyst having high activity for the hydrogenation of aromatics in aromatic and sulfur-bearing hydrocarbon oils which comprises impregnating an alumina carrier containing less than 7% silica with soluble compounds of tungsten, molybdenum and nickel convertible to the oxides upon calcination, the mole ratio of nickel to molybdenum being ½ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 210° C. but above about 110° C. with a mixture of hydrogen and hydrogen sulfide in a mole ratio between 1:1 and 40:1.

11. Catalyst having high activity for the hydrogenation of aromatics in aromatic and sulfur-bearing hydrocarbon oils prepared by impregnating an alumina carrier with soluble compounds of tungsten, and molybdenum, and nickel convertible to the oxides upon calcination, the mole ratio of nickel to molybdenum being between ¼ and ⅔ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 215° C. but above about 110° C. with a mixture of hydrogen and hydrogen sulfide in a mole ratio between 1:1 and 40:1.

12. Catalyst having high activity for the hydrogenation of aromatics in aromatic and sulfur-bearing hydrocarbon oils prepared by impregnating an alumina carrier with soluble compounds of tungsten, molybdenum and nickel convertible to the oxides upon calcination, the mole ratio of nickel to molybdenum being between ⅓ and ½ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 215° C. but above about 110° C. with a mixture of hydrogen and hydrogen sulfide in a mole ratio between 1:1 and 40:1.

13. Catalyst having high activity for the hydrogenation of aromatics in aromatic and sulfur-bearing hydrocarbon oils prepared by impregnating an alumina carrier with soluble compounds of tungsten, molybdenum, and nickel convertible to the oxides upon calcination, the mole ratio of nickel to molybdenum being about ½ to 1, the mole ratio of tungsten to molybdenum being between ¼ and 1 to 1, and the total metals content being below about 25% by weight, calcining to convert the metal compounds to the corresponding oxides, and partially sulfiding by treatment for at least ½ hour at a temperature below about 215° C. but above about 110° C. with a mixture of hydrogen and hydrogen sulfide in a mole ratio between 1:1 and 40:1.

14. Catalyst having high activity for the hydrogenation of aromatics in aromatic and sulfur-bearing hydrocarbon oils prepared by impregnating an alumina carrier containing silica in an amount less than 7% with soluble compounds of tungsten, molybdenum, and nickel convertible to the oxides upon calcination, the mole ratio of nickel to molybdenum being between ¼ and ⅔ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 210° C. but above about 110° C. with a mixture of hydrogen and hydrogen sulfide in a mole ratio of about 12:1.

15. Catalyst having high activity for the hydrogenation of aromatics in aromatic and sulfur-bearing hydrocarbon oils prepared by impregnating an alumina carrier with ammoniacal ammonium tungstate and nickel carbonate calcining to convert these metals to the oxides, then impregnating ammonium molybdate, the mole ratio of nickel to molybdenum being between ¼ and ⅔ to 1, the mole ratio of tungsten to molybdenum being between ¼ and 1 to 1, and the total metals content being between about 8% and 25% by weight, again calcining to convert the molybdenum to the oxide and partially sulfiding by treatment for at least ½ hour at a temperature below about 215° C. but above about 110° C. with a mixture of hydrogen and hydrogen sulfide in a mole ratio between 1:1 and 40:1.

16. Process for the hydrogenation of hydrocarbon oils containing organic nitrogen-containing substances to reduce the nitrogen content thereof which comprises contacting the oil under hydrogenating conditions of pressure above about 20 atmospheres and temperature between about 360 and 450° C. in the presence of added hydrogen with a supported tungsten-molybdenum-nickel catalyst prepared by impregnating an alumina carrier with soluble compounds of tungsten, molybdenum and nickel convertible to the oxides upon calcination, the mole ratio of nickel to molybdenum being ¼ and ⅔ to 1, the mole ratio of tungsten to molybdenum being between ¼ and 1 to 1, and the total metals content being above about 8% by weight, calcining to convert the metal compounds to the corresponding oxides, and partially sulfiding by treatment for at least ½ hour at a temperature below about 215° C. but above about 110° C. with a mixture of hydrogen and hydrogen sulfide in a mole ratio between 1:1 and 40:1.

References Cited in the file of this patent

UNITED STATES PATENTS

| | | |
|---|---|---|
| 1,998,626 | Koenig | Apr. 23, 1935 |
| 2,426,929 | Greensfelder | Sept. 2, 1947 |
| 2,486,361 | Nahin et al. | Oct. 23, 1949 |

FOREIGN PATENTS

| | | |
|---|---|---|
| 333,511 | Great Britain | Aug. 5, 1930 |